(12) United States Patent
Grabowsky et al.

(10) Patent No.: US 12,513,734 B2
(45) Date of Patent: Dec. 30, 2025

(54) DYNAMIC TRANSMISSION CONTROL FOR A WIRELESS NETWORK

(71) Applicant: AeroVironment, Inc., Simi Valley, CA (US)

(72) Inventors: John F. Grabowsky, Camarillo, CA (US); Phillip T. Tokumaru, Thousand Oaks, CA (US); Robert J. Kniskern, Fort Wayne, IN (US); Nicholas S. Currens, Lima, OH (US); Allan L. Levine, Thousand Oaks, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

(21) Appl. No.: 18/204,223

(22) Filed: May 31, 2023

(65) Prior Publication Data
US 2024/0080876 A1 Mar. 7, 2024

Related U.S. Application Data

(60) Division of application No. 16/909,833, filed on Jun. 23, 2020, now Pat. No. 11,672,003, which is a
(Continued)

(51) Int. Cl.
*H04W 72/543* (2023.01)
*H04B 7/185* (2006.01)
(Continued)

(52) U.S. Cl.
CPC ...... *H04W 72/543* (2023.01); *H04B 7/18504* (2013.01); *H04W 72/0446* (2013.01); *H04L 67/12* (2013.01); *H04W 28/20* (2013.01)

(58) Field of Classification Search
CPC ........... H04W 72/543; H04W 72/0446; H04W 28/20; H04W 88/04; H04W 28/10; H04B 7/18504; H04L 67/12
See application file for complete search history.

(56) References Cited

U.S. PATENT DOCUMENTS

| 4,117,267 A | 9/1978 | Haberle et al. |
| 5,598,416 A | 1/1997 | Yamada et al. |

(Continued)

FOREIGN PATENT DOCUMENTS

| CN | 1740995 A | 3/2006 |
| CN | 101185301 A | 5/2008 |

(Continued)

OTHER PUBLICATIONS

Intellectual Property Office of Singapore (IPOS) Search Report (Search_Rpt) and Written Opinion (WO) mailed Apr. 17, 2014 for corresponding Singapore Patent Application No. 201203958-2 Entitled Dynamic Transmission Control for a Wireless Network by Grabowsky et al., Hungarian Patent Office; 13 pgs.
(Continued)

*Primary Examiner* — Ankur Jain
(74) *Attorney, Agent, or Firm* — Christopher R. Balzan, Esq.; Eric J. Aagaard, Esq.

(57) ABSTRACT

In one possible embodiment, a wireless network with dynamic transmission control is provided that includes a multiple of nodes. The nodes include an arbiter and multiple client nodes. The arbiter is configured to control an operation of the client nodes by defining communications operation cycles and allocating a bandwidth to each of the client nodes on a cycle by cycle basis in response to requests for bandwidth from the client nodes.

20 Claims, 10 Drawing Sheets

Related U.S. Application Data division of application No. 14/702,445, filed on May 1, 2015, now Pat. No. 10,736,121, which is a continuation of application No. 12/878,989, filed on Sep. 9, 2010, now Pat. No. 9,084,276.

(60) Provisional application No. 61/241,854, filed on Sep. 11, 2009.

(51) Int. Cl.
*H04W 72/0446* (2023.01)
*H04L 67/12* (2022.01)
*H04W 28/20* (2009.01)

(56) References Cited

U.S. PATENT DOCUMENTS

| | | | |
|---|---|---|---|
| 5,864,560 A | 1/1999 | Li et al. | |
| 6,018,659 A | 1/2000 | Ayyagari et al. | |
| 6,226,572 B1 | 5/2001 | Tojima et al. | |
| 6,272,325 B1 | 8/2001 | Wiedeman et al. | |
| 6,282,206 B1 | 8/2001 | Hindus et al. | |
| 6,480,506 B1 | 11/2002 | Gubbi | |
| 6,587,700 B1 | 7/2003 | Meins et al. | |
| 7,039,367 B1 | 5/2006 | Kucik | |
| 7,062,250 B1 | 6/2006 | Kosaka | |
| 7,129,823 B2 | 10/2006 | Shintani et al. | |
| 7,313,409 B2* | 12/2007 | Iacono | H01Q 3/24 455/92 |
| 7,330,445 B2 | 2/2008 | Park | |
| 7,412,517 B2* | 8/2008 | Jorgensen | H04L 69/165 455/452.2 |
| 7,511,662 B2* | 3/2009 | Mathews | G01S 5/0289 342/463 |
| 7,526,303 B2* | 4/2009 | Chary | H04W 52/0261 455/343.1 |
| 7,581,702 B2* | 9/2009 | Olson | G05D 1/0022 701/2 |
| 7,793,295 B2* | 9/2010 | Huang | G06F 13/28 710/24 |
| 8,218,615 B2* | 7/2012 | Wei | H04L 25/03057 375/233 |
| 8,300,533 B2* | 10/2012 | Malladi | H04L 5/0048 370/235 |
| 8,547,736 B2* | 10/2013 | Rao | G11C 11/16 365/158 |
| 8,547,797 B2* | 10/2013 | Wilcox | G01V 5/02 367/77 |
| 9,084,276 B2* | 7/2015 | Grabowsky | H04W 88/04 |
| 10,736,121 B2 | 8/2020 | Grabowski et al. | |
| 11,672,003 B2 | 6/2023 | Grabowsky et al. | |
| 2002/0052956 A1 | 5/2002 | Seibold et al. | |
| 2003/0060161 A1 | 3/2003 | Park | |
| 2003/0164794 A1 | 9/2003 | Haynes et al. | |
| 2004/0109428 A1 | 6/2004 | Krishnamurthy | |
| 2004/0204194 A1 | 10/2004 | Akai et al. | |
| 2005/0002362 A1 | 1/2005 | Kim et al. | |
| 2005/0078672 A1 | 4/2005 | Caliskan et al. | |
| 2005/0262216 A1 | 11/2005 | Kashiwabara et al. | |
| 2006/0009262 A1 | 1/2006 | Hamm | |
| 2006/0019610 A1 | 1/2006 | Ue et al. | |
| 2006/0061506 A1 | 3/2006 | Murphy | |
| 2006/0120433 A1 | 6/2006 | Baker et al. | |
| 2006/0198346 A1 | 9/2006 | Liu et al. | |
| 2006/0229080 A1 | 10/2006 | Khan et al. | |
| 2007/0019569 A1 | 1/2007 | Park et al. | |
| 2007/0053308 A1 | 3/2007 | DuMas et al. | |
| 2007/0160055 A1 | 7/2007 | Takahashi | |
| 2007/0210953 A1 | 9/2007 | Abraham et al. | |
| 2008/0007447 A1* | 1/2008 | Vincent | F42B 12/365 342/57 |
| 2008/0027591 A1* | 1/2008 | Lenser | G05D 1/0038 701/28 |
| 2008/0069029 A1* | 3/2008 | Chow | H04W 8/005 370/328 |
| 2008/0112370 A1* | 5/2008 | Kwon | H04W 28/20 370/336 |
| 2008/0263628 A1* | 10/2008 | Norman | G08C 17/02 726/1 |
| 2008/0268855 A1* | 10/2008 | Hanuni | H04L 41/0896 455/445 |
| 2009/0021423 A1* | 1/2009 | Cheng | G01S 13/89 342/25 A |
| 2009/0078817 A1* | 3/2009 | Williams | F41G 3/145 244/3.16 |
| 2009/0130982 A1* | 5/2009 | Coulmeau | G08G 5/0013 455/63.3 |
| 2009/0152391 A1* | 6/2009 | McWhirk | B64B 1/70 244/30 |
| 2009/0154407 A1* | 6/2009 | Jeong | H04W 48/08 370/329 |
| 2009/0164638 A1* | 6/2009 | Jang | H04W 72/56 709/226 |
| 2009/0214231 A1* | 8/2009 | Nagai | G03G 15/0856 358/1.9 |
| 2009/0222207 A1* | 9/2009 | Bernhardt | G01J 3/0264 702/2 |
| 2009/0238096 A1 | 9/2009 | DuMas et al. | |

FOREIGN PATENT DOCUMENTS

| | | |
|---|---|---|
| CN | 101267612 A | 9/2008 |
| CN | 101296019 A | 10/2008 |
| CN | 201166793 Y | 12/2008 |
| CN | 101385059 A | 3/2009 |
| CN | 101470210 A | 7/2009 |
| CN | 101479622 A | 7/2009 |
| CN | 201285418 Y | 8/2009 |
| CN | 101523840 A | 9/2009 |
| EP | 1458141 A2 | 9/2004 |
| EP | 2056059 A1 | 5/2009 |
| EP | 2073414 A1 | 6/2009 |
| EP | 2094047 A1 | 8/2009 |
| JP | H10150401 A | 6/1998 |
| JP | 2000049738 A | 2/2000 |
| JP | 2003-032739 A | 1/2003 |
| JP | 2003309506 A | 10/2003 |
| JP | 2004-336408 | 11/2004 |
| JP | 2006-526932 A | 11/2004 |
| JP | 2004-343759 | 12/2004 |
| JP | 2006-333360 A | 12/2006 |
| JP | 2007189464 A | 7/2007 |
| JP | 2008-148039 | 6/2008 |
| JP | 2009-033678 A | 2/2009 |
| JP | 2011044917 A | 3/2011 |
| WO | 2004-109996 A1 | 12/2004 |
| WO | 2007/034428 A2 | 3/2007 |
| WO | 2008-016846 A2 | 2/2008 |
| WO | 2008016848 A2 | 2/2008 |
| WO | 2008073089 A1 | 6/2008 |
| WO | 2009/029608 A1 | 3/2009 |

OTHER PUBLICATIONS

Response to Intellectual Property Office of Singapore Written Opinion (IPOS_R-WO) mailed Apr. 17, 2014 filed Nov. 10, 2014 for corresponding Singapore Patent Application No. 201203958-2 Entitled Dynamic Transmission Control for a Wireless Network by Grabowsky et al., from Hungarian Patent Office; 17 pgs.

Taiwan Intellectual Property Office (TIPO) English translation of Office Action (OA) for corresponding Taiwan Patent Application No. 99130704 Issued Jan. 28, 2014 Entitled Dynamic Transmission Control for a Wireless Network by Grabowsky et al.; from Taiwan Intellectual Property Office; 4 pgs.

The State Intellectual Property Office of the People's Republic of China (SIPO) English translation of First Office Action (OA1) for corresponding Chinese Patent Application No. 201080051392.4 Issued Jul. 29, 2014 Entitled Dynamic Transmission Control for a

(56) References Cited

OTHER PUBLICATIONS

Wireless Network by Grabowsky et al., from The State Intellectual Property Office of The People's Republic of China; 8 pgs.
The State Intellectual Property Office of the People's Republic of China (SIPO) English translation of Search Report (Search_Rpt) for corresponding Chinese Patent Application No. 201080051392.4 Issued Jul. 21, 2014 Entitled Dynamic Transmission Control for a Wireless Network by Grabowsky et al., from The State Intellectual Property Office of The People's Republic of China; 2 pgs.
Australian Government IP Australia (AU) Patent Examination Report (Exam_Rpt) for for corresponding Australian Patent Application No. 2010292009 Issued Sep. 11, 2014 Entitled Dynamic Transmission Control for a Wireless Network by Grabowsky et al., from Australian Government IP Australia; 3 pgs.
International Searching Authority; Patent Cooperation Treaty (PCT) International Search Report (ISR) for corresponding PCT case Application No. PCT/US2010/048539 mailed May 30, 2011 Entitled Dynamic Transmission Control for a Wireless Network by Grabowsky et al., from Korean Intellectual Property Office; 3 pgs.
International Searching Authority; Patent Cooperation Treaty (PCT) Written Opinion (WO) for corresponding PCT case Application No. PCT/US2010/048539 mailed May 30, 2011 Entitled Dynamic Transmission Control for a Wireless Network by Grabowsky et al., from Korean Intellectual Property Office; 5 pgs.
Japan Patent Office (JPO) machine translation of Office Action (OA) for corresponding Japanese Patent Application No. 2012-528952 Entitled Dynamic Transmission Control for a Wireless Network by Grabowsky et al.; Issued Feb. 6, 2014 from Japan Patent Office; 3 pgs.
Taiwan Intellectual Property Office (TIPO) English translation of Search Report (Search_Rpt) for corresponding Taiwan Patent Application No. 99130704 Entitled Dynamic Transmission Control for a Wireless Network by Grabowsky et al.; dated Jan. 24, 2014 from Taiwan Intellectual Property Office; 1 pg.
The State Intellectual Property Office of the People's Republic of China (SIPO) English translation of Second Office Action (OA2) for corresponding Chinese Patent Application No. 201080051392.4 Issued Jun. 8, 2015 Entitled Dynamic Transmission Control for a Wireless Network by Grabowsky et al., from The State Intellectual Property Office of The People's Republic of China; 4 pgs.
The State Intellectual Property Office of the People's Republic of China (SIPO) English translation of Third Office Action (OA3) for corresponding Chinese Patent Application No. 201080051392.4 Issued Feb. 19, 2016 Entitled Dynamic Transmission Control for a Wireless Network by Grabowsky et al., from The State Intellectual Property Office of The People's Republic of China; 4 pgs.
Korea Intellectual Property Office (KIPO) English translation of First Office Action (OA1) for corresponding Korean Patent Application No. 10-2012-7009413 Entitled Dynamic Transmission Control for a Wireless Network by Grabowsky et al.; Issued Apr. 21, 2016 from Korean Intellectual Property Office; 7 pgs.
Taiwan Intellectual Property Office (TIPO) English translation of Office Action (OA1) for corresponding Divisional Taiwan Patent Application No. 104106303 Issued May 20, 2016 Entitled Dynamic Transmission Control for a Wireless Network by Grabowsky et al.; from Taiwan Intellectual Property Office; 7 pgs.
Taiwan Intellectual Property Office (TIPO) English translation of Search Report (Search_Rpt) for corresponding Divisional Taiwan Patent Application No. 104106303 Issued May 19, 2016 Entitled Dynamic Transmission Control for a Wireless Network by Grabowsky et al.; from Taiwan Intellectual Property Office; 1 pg.
Japan Patent Office (JPO) English translation of First Office Action (OA1) for corresponding Divisional Japanese Patent Application No. 2015-021086 Entitled Dynamic Transmission Control for a Wireless Network by Grabowsky et al.; Issued Jun. 14, 2016 from Japan Patent Office; 3 pgs.
European Patent Office (EPO) extended European Search Report (eESR) for corresponding Patent Application No. EP 10 81 6208 Entitled Dynamic Transmission Control for a Wireless Network by Grabowsky et al.; Issued Sep. 15, 2016 from European Patent Office; 9 pgs.
Canadian Intellectual Property Office (CIPO) First Office Action (OA1) and Search Report (Search_Rpt) for corresponding Canadian Patent Application No. 2 784 255 Entitled Dynamic Transmission Control for a Wireless Network by Grabowsky et al.; Issued Oct. 3, 2016 from Canadian Property Office; 5 pgs.
Intellectual Property Office of Singapore (IPOS) Examination Report (Exam_Rpt) mailed Aug. 31, 2016 for corresponding Singapore Patent Application No. 201203958-2 Entitled Dynamic Transmission Control for a Wireless Network by Grabowsky et al., from Intellectual Property Office of Singapore; 7 pgs.
The State Intellectual Property Office of the People's Republic of China (SIPO) English translation of Fourth Office Action (OA4) for corresponding Chinese Patent Application No. 201080051392.4 Issued Jan. 5, 2017 Entitled Dynamic Transmission Control for a Wireless Network by Grabowsky et al., from The State Intellectual Property Office of The People's Republic of China; 10 pgs.
Japan Patent Office (JPO) English translation of Second Office Action (OA2) for corresponding Divisional Japanese Patent Application No. 2015-021086 Entitled Dynamic Transmission Control for a Wireless Network by Grabowsky et al.; Issued Jun. 20, 2017 from Japan Patent Office; 4 pgs.
The State Intellectual Property Office of the People's Republic of China (SIPO) English translation of Fifth Office Action (OA5) for corresponding Chinese Patent Application No. 201080051392.4 Issued Sep. 5, 2017 Entitled Dynamic Transmission Control for a Wireless Network by Grabowsky et al., from the State Intellectual Property Office of The People's Republic of China; 3 pgs.
The State Intellectual Property Office of the People's Republic of China (SIPO) English translation of Search Report (Srch_Rpt) for corresponding Chinese Patent Application No. 201080051392.4 Issued Sep. 5, 2017 Entitled Dynamic Transmission Control for a Wireless Network by Grabowsky et al., from the State Intellectual Property Office of The People's Republic of China; 2 pgs.
Canadian Intellectual Property Office (CIPO) Second Office Action (OA2) and Search Report for corresponding Canadian Patent Application No. 2,784,255 Issued Apr. 19, 2018 Entitled Dynamic Transmission Control for a Wireless Network by Grabowsky et al., from Canadian Intellectual Property Office; 5 pgs.
Taiwan Intellectual Property Office (TIPO) English translation of Office Action (OA1) for corresponding Taiwan Patent Application No. 106103471 Issued Mar. 7, 2018 Entitled Dynamic Transmission Control for a Wireless Network by Grabowsky et al., from Taiwan Intellectual Property Office; 10 pgs.
Taiwan Intellectual Property Office (TIPO) English translation of Search Report (Srch_Rpt) for corresponding Taiwan Patent Application No. 106103471 Issued Mar. 7, 2018 Researched Feb. 28, 2018 Entitled Dynamic Transmission Control for a Wireless Network by Grabowsky et al., from Taiwan Intellectual Property Office; 1 pg.
Taiwan Intellectual Property Office (TIPO) English translation of Second Office Action (20A) for corresponding Taiwan Divisional Patent Application No. 106103471 Issued Dec. 19, 2018 Entitled Dynamic Transmission Control for a Wireless Network by Grabowsky et al., from Taiwan Intellectual Property Office; 8 pgs.
Taiwan Intellectual Property Office (TIPO) English translation of Search Report (Srch_Rpt) for corresponding Taiwan Divisional Patent Application No. 106103471 Issued Dec. 10, 2018 Entitled Dynamic Transmission Control for a Wireless Network by Grabowsky et al., from Taiwan Intellectual Property Office; 1 pg.
Japan Patent Office (JPO) English translation of First Office Action (10A) for corresponding Japanese Divisional Patent Application No. 2018-89489 Entitled Dynamic Transmission Control for a Wireless Network by Grabowsky et al.; Issued Feb. 26, 2019 from Japan Patent Office; 5 pgs.
Canada Intellectual Property Office (CIPO) Third Office Action (30A) and Search Report (Search_Rpt) for corresponding Canadian Patent Application No. 2,784,255 Entitled Dynamic Transmission Control for a Wireless Network by Grabowsky et al.; Issued Mar. 26, 2019 from Canada Intellectual Property Office; 5 pgs.

(56) References Cited

OTHER PUBLICATIONS

European Patent Office (EPO) extended European Search Report (eESR) for corresponding European Patent Application No. 18 186 519.7 Entitled Dynamic Transmission Control for a Wireless Network by Grabowsky et al.; Issued Nov. 16, 2018 from European Patent Office; 9 pgs.
Intellectual Property India (IPI) First Examination Report (FER) for corresponding Indian Patent Application No. 858/KOLNP/2012 Entitled Dynamic Transmission Control for a Wireless Network by Grabowsky et al.; Issued Apr. 16, 2019 from Intellectual Property India; 8 pgs.
Korea Intellectual Property Office (KIPO) English translation of First Office Action (OA1) for corresponding Korean Patent Application No. 10-2019-7008140 entitled Dynamic Transmission Control for a Wireless Network by Grabowsky et al.; Issued Jul. 9, 2019 from Korean Intellectual Property Office; 2 pgs.
Taiwan Intellectual Property Office (TIPO) English translation of Third Office Action (3OA) for corresponding Taiwan Divisional Patent Application No. 106103471 Issued Jul. 25, 2019 entitled Dynamic Transmission Control for a Wireless Network by Grabowsky et al., from Taiwan Intellectual Property Office; 4 pgs.
Australian Government, IP Australia (AUIP); Examiner's Report (Exam_Rpt) for corresponding Australian case application No. 2018203707 entitled Dynamic Transmission Control for a Wireless Network by Grabowsky et al., Issued Aug. 2, 2019 from the Australian Government, IP Australia; 3 pgs.
Canadian Intellectual Property Office (CIPO); Examination Report (Exam_Rpt) for corresponding Canadian case application No. 2,784,255, entitled Dynamic Transmission Control for a Wireless Network by Grabowsky et al., dated Mar. 13, 2020 from Canadian Intellectual Property Office, 5 pgs.
Korean Intellectual Property Office (KIPO); English translation of Office Action (OA) for corresponding Korean case application No. 10-2020-7012645 entitled Dynamic Transmission Control for a Wireless Network by Grabowsky et al., issued Jul. 28, 2020 from Korean Intellectual Property Office, 2 pgs.
Japan Patent Office (JPO); Machine Translation of First Office Action (1OA) for corresponding Japanese case application No. 2019-182799 entitled Dynamic Transmission Control for a Wireless Network by Grabowsky et al., issued Aug. 4, 2020 from Japan Patent Office, 3 pgs.
Japan Patent Office (JPO) English translation of Second Office Action (OA2) for corresponding Divisional Japanese Patent Application No. 2019-182799 Entitled Dynamic Transmission Control For a Wireless Network by Grabowsky et al.; issued Mar. 9, 2021 from Japan Patent Office; 3 pgs.
European Patent Office (EPO) extended European Search Report (eESR) for corresponding Divisional European Patent Application No. 20216254.1 Entitled Dynamic Transmission Control For a Wireless Network by Grabowsky et al.; issued Apr. 14, 2021 from European Patent Office; 10 pgs.
The State Intellectual Property Office of the People's Republic of China (SIPO) English translation of First Office Action (OA1) for corresponding Divisional Chinese Patent Application No. 2018103677873 Entitled Dynamic Transmission Control For a Wireless Network by Grabowsky et al.; issued Nov. 3, 2020 from The State Intellectual Property Office of The People's Republic of China; 4 pgs.
The State Intellectual Property Office of the People's Republic of China (SIPO) English translation of Search Report (Search_Rpt) for corresponding Divisional Chinese Patent Application No. 2018103677873 Entitled Dynamic Transmission Control For a Wireless Network by Grabowsky et al.; issued Nov. 3, 2020 from The State Intellectual Property Office of The People's Republic of China; 7 pgs.
Taiwan Intellectual Property Office (TIPO) English translation of Office Action (OA) for corresponding Divisional Taiwanese Patent Application No. 109109887 Entitled: Dynamic Transmission Control For A Wireless Network by Grabowsky et al.; issued Apr. 13, 2021 from the Taiwan Intellectual Property Office; 6pgs.
Indian Patent Office (IPO) English translation of Examination Report (Exam_Rpt) for corresponding Divisional Indian Patent Application No. 202038001948 Entitled: A Method For Communicating On A Wireless Network Having A Plurality Of Nodes by Grabowsky et al.; issued Aug. 4, 2021 from the Indian Patent Office; 8 pgs.
Australian Government Intellectual Property (AUIP) English translation of First Examination Report (Exam_Rpt1) for corresponding Australian Patent Application No. 2020273375 Entitled: Dynamic Transmission Control for a Wireless Network by Grabowsky et al.; issued Aug. 28, 2021 from the Australian Government Intellectual Property; 4 pgs.
China National Intellectual Property Administration (CNIPA) English translation of Search Report (Search_Rpt) for corresponding Divisional Chinese Patent Application No. 201810367787.3 Entitled: Method and System for Dynamic Transmission Control for a Wireless Network by Grabowsky et al.; issued Aug. 30, 2021 from the China National Intellectual Property Adminstration; 2 pgs.
Japan Patent Office (JPO) English translation of Third Office Action (OA3) for corresponding Divisional Japanese Patent Application No. 2019-182799 Entitled: Dynamic Transmission Control for a Wireless Network by Grabowsky et al.; issued Sep. 22, 2021 from the Japan Patent Office; 8 pgs.
Taiwain Intellectual Property Office (TIPO) English translation of Office Action (OA) for corresponding Divisional Taiwanese Patent Application No. 109109887 Entitled Method and System for Dynamic Transmission Control for a Wireless Network by Grabowsky et al.; issued Oct. 26, 2021 from the Taiwan Intellectual Property Office; 5 pgs.
Australian Government Intellectual Property (AUIP) English translation of First Examination Report (Exam_Rpt1) for corresponding Australian Patent Application No. 202224716 Entitled: Dynamic Transmission Control for a Wireless Network by Grabowsky et al.; issued Jun. 7, 2023 from the Australian Government Intellectual Property; 3 pgs.
Japan Patent Office (JPO) English translation of First Office Action (OA) for corresponding Divisional Japanese Patent Application No. 2022-125396; Entitled: Dynamic Transmission Control for a Wireless Network by Grabowsky et al.; issued Jun. 13, 2023 from the Japan Patent Office; 5 pgs.
Taiwain Intellectual Property Office (TIPO) English translation of Office Action (OA) for corresponding Divisional Taiwanese Patent Application No. 110138328 Entitled Method and System for Dynamic Transmission Control for a Wireless Network by Grabowsky et al.; issued Aug. 31, 2023 from the Taiwan Intellectual Property Office; 12 pgs.
Peter Rigstad, "UAVs as Communications Routing Nodes in Network-Centric Warfare," Unmanned Systems 2003 Symposium & Exhibition, Jul. 15-17, 2003, 25 pgs.
Japan Patent Office (JPO) English translation of First Office Action (OA) for corresponding Divisional Japanese Patent Application No. 2024-004993; Entitled: Dynamic Transmission Control for a Wireless Network by Grabowsky et al.; issued Nov. 12, 2024; from the Japan Patent Office; 6 pgs.
Taiwain Intellectual Property Office (TIPO) English translation of Office Action (OA) and Search Report (SR) for corresponding Divisional Taiwanese Patent Application No. 113121217 Entitled Method and System for Dynamic Transmission Control for a Wireless Network by Grabowsky et al.; issued Mar. 5, 2025 from the Taiwan Intellectual Property Office; 4 pgs.

\* cited by examiner

| | DDL Protocol Layers |
|---|---|
| Network Layer | External devices communicate with other devices<br>IP addresses (IP address with port "xxx.xxx.xxx.xxx:zzz")<br>Encrypted IP addresses and data |
| Link Layer | DDL nodes communicate with other DDL nodes<br>DDL addresses (16-bit RUID with DDL port "xxxxx:zzz")<br>Unencrypted DDL addresses, encrypted data |
| Physical Layer | DDL hardware transmits and receives packets<br>Transmission time slots, transmitter power levels<br>RF signal processing, forward error correction<br>Frequency |

FIG. 2

DYNAMIC TRANSMISSION CONTROL FOR A WIRELESS NETWORK

CROSS REFERENCE TO RELATED APPLICATION

This application is a divisional of U.S. patent application Ser. No. 16/909,833, by Grabowsky et al., entitled DYNAMIC TRANSMISSION CONTROL FOR A WIRELESS NETWORK, filed Jun. 23, 2020, which is a divisional of U.S. patent application Ser. No. 14/702,445, by Grabowsky et al., entitled DYNAMIC TRANSMISSION CONTROL FOR A WIRELESS NETWORK, filed May 1, 2015, which is a continuation of U.S. patent application Ser. No. 12/878,989, by Grabowsky et al., entitled DYNAMIC TRANSMISSION CONTROL FOR A WIRELESS NETWORK, filed Sep. 9, 2010, which claims the benefit of U.S. Provisional Application No. 61/241,854, filed on Sep. 11, 2009, by Grabowsky et al., entitled DYNAMIC TRANSMISSION CONTROL FOR A WIRELESS NETWORK, which are all herein incorporated by reference in their entireties.

BACKGROUND

Small Unmanned Vehicle Systems, such as UAVs, can accomplish their missions using Digital Data Link (DDL) communications. For example, an unmanned aerial vehicle or UAV transmits via the DDL a large amount of data (video) to a ground controller, with a small amount of data being transmitted to the UAV. Since the unmanned vehicles are typically power constrained, the bulk of the DDL data, video data from the UAV, is transmitted by the power constrained UAV.

Moreover, it is critical that many of the DDL signals be real time. To control a remotely piloted vehicle, the operator receives, views, and mentally processes real time video, and then physically responds, i.e. moves a control stick, to transmit control signals to the vehicle, which are acted upon by the vehicle. It requires full motion real time data in both directions.

Traditional systems, WiMax, cellular phone, are optimized without regard to power constraints, and without regard to critical timing constraints based on the nature of the information within the signal. With traditional systems, for high quality video, time is not critical, so it is typically buffered, to take advantage of time gaps. In a UAV, such buffering is not possible due to the critical nature of the response to the video signal. With packet voice or video telephony, the data is heavily compressed, with lower data rates, and not full motion high quality real time data. With UAVs, however, the data needs to be transmitted to the operator quickly, when ready, and not buffered for when it is convenient for the medium or the protocol.

In addition, for UAVs, the DDL must satisfy a number of operational scenarios not present in traditional system.

What is needed are planned DDL services and features that enable aircraft and ground devices to fulfill their missions.

SUMMARY

In one possible implementation, a method is provided for communicating on a wireless network having a plurality of unmanned vehicle nodes, the method including selecting an unmanned vehicle to function as arbiter for controlling communication of at least one non-arbiter node of the plurality of nodes on the wireless network including receiving at the arbiter requests for a desired bandwidth from the at least one non-arbiter node, adjusting dynamically the bandwidth allocated to the at least one non-arbiter node based on the requests, and using the unmanned vehicle arbiter to define operation cycles and assign a transmission start time and duration for each cycle to the at least one non-arbiter node, using the unmanned vehicle arbiter as a relay for relaying data between two of the non-arbiter nodes, launching a relief unmanned vehicle to assume the function of arbiter to replace the unmanned vehicle arbiter when the unmanned vehicle arbiter has low power, and transferring the arbiter functions to the relief unmanned vehicle to provide a new arbiter.

BRIEF DESCRIPTION OF THE DRAWINGS

The features and advantages of the present invention will be better understood with regard to the following description, appended claims, and accompanying drawings where:

FIG. 2 illustrates a network architecture and the protocol layers.

DESCRIPTION

In various embodiments, a wireless network has multiple nodes (transmitters/receivers controlled by an operating system) where one of the nodes functions as an arbiter to control operation of the other nodes. The arbiter defines operation cycles which are each divided up into a set of time segments. The arbiter also assigns to each node in the network a transmission start time (a time segment) and transmission duration for each cycle (number of time segments). The transmission start time and the duration can be changed for each node and for each cycle (thus dynamic) by the arbiter. The nodes can be ground control stations GCUs, unmanned vehicles, such as unmanned aerial vehicles or UAVs, or the like. In some embodiments, the ground station may operate as the arbiter and the UAVs will be the nodes being given varying transmission times. Since small UAVs require very scarce radio spectrum, this allows the allocated radio spectrum to be efficiently shared by multiple nodes (potentially multiple UAVs and ground systems) by adjusting the bandwidth allocated to each node depending on the instantaneous demand by the node as well as the need of the operator. This allows the operator to control whether each UAV either, transmits full video, transmit degraded video or still pictures, or does not transmit any imagery, maximizing the bandwidth available for the most desired transmission purpose, and reducing the bandwidth for the less desired purposes.

Figure 1:
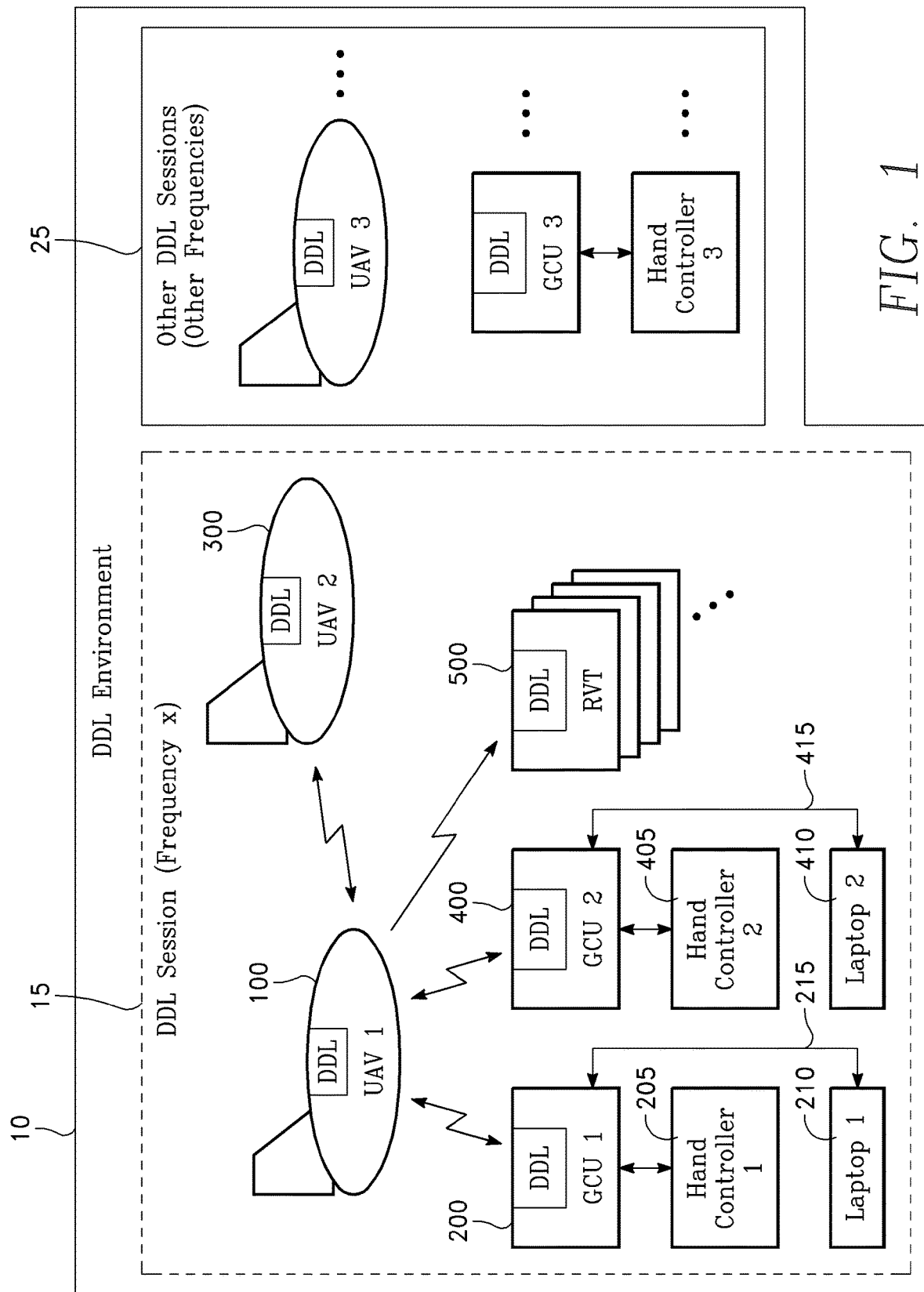
FIG. 1 is a block diagram illustrating an example DDL environment.

FIG. 1 is a block diagram illustrating an example DDL environment 10. In one DDL session 15 in a frequency band x, the DDL environment 10 incorporates unmanned vehicles UAV1 and UAV2, such as aerial vehicles, each containing a DDL node 100 and 300, respectively. The DDL environment 10 may further incorporate manned ground stations GCU1 and GCU2, each containing a DDL node 200 and 400, respectively. Handheld controllers 205 and 405 connected to GCU1 and GCU2, respectively, are used by the operator (not shown) to generate control signals for UAV1 or UAV2. Optionally, the DDL environment 10 may also incorporate external devices 210 and 410, such as laptops, physically connected to a DDL node 200 and 400, respectively, such as via Ethernet connections 215 and 415. Moreover, one or more optional remote viewing terminal(s) RVT containing a DDL node 500 may be included. The remote viewing terminal(s) and/or ground stations may optionally contain push-to-talk or PTT voice communications capability (not illustrated) in FIG. 1. In addition to the DDL session 15, other DDL sessions 25, operating in other operating frequency bands, also may be present in the DDL environment 10.

The DDL environment 10 and associated architecture show in FIG. 1 is for illustration purposes and allows multiple devices, components, or items of the various types discussed above, or other device or item types. Furthermore, several of the devices, components, or items may be combined or omitted as desired. For example, the ground station GCU1 and the handheld controller 205 may be combined into a single device. Or, for example the external device 210 may be omitted, or may be a device other than a laptop computer device.

The DDL system may contain various functional and design constraints, depending on the embodiment. In various embodiments, the DDL system should provide some or all of the following functions:

DDL Nodes should be able to address each other.

Laptops (or Hand Controllers) should be able to address their local DDL Node. This is the node within the ground station that the laptop plugs into.

Laptops (or Hand Controllers) should be able to address all DDL Nodes (not just the local DDL Node).

Laptops should be able to address other Laptops (which are plugged in to other DDL Nodes).

The DDL LAN should support a router connected to a local DDL Node and also to a Wide-Area-Network to provide connectivity between the two.

Moreover, in various embodiments, the DDL system design my conform to some or all of the following constraints:

The Hand Controller is optional. The local DDL Node should be capable of connecting to a DDL network without a Hand Controller.

The Laptop is optional. The local DDL Node should be capable of connecting to a DDL network without a Laptop.

Operator setup should not be required. Basic DDL scenarios can be satisfied without requiring an Operator to pre-configure DDL Nodes. Advanced scenarios may require minimal Operator setup.

Non-standard laptop software should not be required. Normal operating system software is sufficient to connect a Laptop to the DDL network. Controlling aircraft requires special software.

Introduction of DDL Nodes or attachment of external devices should not cause service disruptions.

Example DDL Scenarios

The list of example scenarios in Table 1 below represent the various missions, and portions of missions, for which DDL may operate, in various UAV embodiments. Other embodiments and scenarios are possible. The scenarios that are portions of missions can occur as part of multiple other missions. For example, the GCS Handoff Scenario may occur during the mission represented by the Classic Scenario, in which case both scenarios impose requirements on the DDL design.

As shown in Table 1, there are multiple scenarios envisioned for operating a DDL network. Some scenarios comprise an entire mission, and other scenarios consist of one portion of a mission. Some scenarios can be components of many missions. The following list in Table 1 is a collection of scenarios that elucidate features applicable to a DDL network design.

TABLE 1

| | | | | | | | |
|---|---|---|---|---|---|---|---|
| | | | Key | | | | |
| Importance | Name | Scenario Description | VBW Split | GCS | AC | EXT | BW Cfg |
| HIGH | Classic | Traditional scenario-one pilot controls one aircraft. BW is devoted to direct aircraft video to ground leg. | 1 | 1 | 1 | | Auto |
| HIGH | Autonomous Continuation | Aircraft commanded to continue mission without continuous control. | 1 | 0 | 1 | | Auto |
| HIGH | GCU Hand-Off | Aircraft mission continues during handoff from one GCU to another. | 1 | 2 | 1 | | Auto |
| HIGH | Shared Video with Push-To-Talk | Traditional scenario, plus multiple RVTs that have PTT voice party line. | 1 | 1 | 1 | 9 | Auto |
| HIGH | Video Relay | Pilot launches relay aircraft which orbits autonomously, then launches and flies sensor aircraft. BW is split between sensor to relay leg, and relay to ground leg. | 2 | 1 | 2 | | Auto |
| MEDIUM | Multiple Pairs | Pilot 1 controls aircraft 1, and Pilot 2 controls aircraft 2, on same channel. BW is split between both aircraft video and relay to ground leg. | 3 | 2 | 2 | | Auto |
| MEDIUM | Data Relay-Small | Pilot launches relay aircraft which orbits autonomously, relay devoted to relaying data between external clients. (See Comm Relay-Large) | 0 | 1 | 1 | 9 | Opr |
| MEDIUM | Relay Relief | Launch relief aircraft to take over as relay and as Arbiter upon battery low. | | 1 | 3 | | Opr |

TABLE 1-continued

Key

| Importance | Name | Scenario Description | VBW Split | GCS | AC | EXT | BW Cfg |
|---|---|---|---|---|---|---|---|
| MEDIUM | Ground Robot | Pilot launches relay aircraft, then another driver controls robot via relay. BW is split between robot video to relay, and relay to ground, and aircraft video to ground. | 3 | 1 | 1 | 2 | Tech |
| MEDIUM | Swarm | Swarm of aircraft fly around single GCU, within direct downlink range (no relay). GCU surfs the video streams. | 4 | 1 | 1 | 2 | Opr |
| LOW | Data Relay-Large | Pilot launches relay aircraft which orbits autonomously, relay devoted to relaying data between external clients. | 0 | 1 | 1 | 100 | Tech |
| LOW | Multi-Hop Relay | Aircraft relay chain beyond direct range of first relay. | 3+ | 1 | 3+ | | Tech |
| LOW | Peer-Peer Direct | Nodes that can hear each other directly, suppress the Arbiter rebroadcast. | 0 | | | | Tech |
| LOW | Mesh | No Arbiter. Nodes repeat any packet they hear, decrementing the Time-To-Live count to zero. | 9 | 1 | 9 | 0 | Tech |
| VBW Split | | Denotes how many video stream bandwidths need to be accommodated. Direct aircraft to ground would be a split of 1, relay would be a split of 2, relay from distant aircraft plus direct from near aircraft would be 3. | | | | | |
| GCS | | Number of Ground Stations (GCUs) transmitting to control aircraft. | | | | | |
| AC | | Number of Aircraft transmitting video and TM. | | | | | |
| EXT | | Number of External data devices, each requiring a ground station for transmitting. | | | | | |
| BW Cfg | | Auto = BW allocation fully automatically ("Split among controlled aircraft") Opr = BW allocation per high-level operator policy ("Split" or "Focus-On-One") Tech = BW allocation specified quantitatively, in detail, by technician | | | | | |

Network Protocol Layers

Network architectures are comprised of a number of protocol layers as shown in FIG. 2. As illustrated in FIG. 2, the DDL network can be viewed as a vertical stack from the lowest physical layer up to the standard network layer. The layers are:

Network Layer—The highest layer transfers Ethernet packets between external devices connected to DDL nodes. Packets have MAC addresses which are used by the external devices to communicate with each other. Normal internet traffic enters the DDL network via one edge DDL node, and exits from all other edge DDL nodes, providing a channel for those external devices to communicate with each other. In the network layer, external devices communicate with other external devices.

Link Layer—This middle layer transfers DDL packets between DDL nodes. These packets have DDL addresses, consisting of a DDL RUID (Random Unit Identifier), sometimes alternatively referred to as a SUID (Session User Identifier), that identifies the DDL node, and a DDL port which identifies a particular input/output port of that DDL node.

Physical Layer—The lowest layer handles timing of transmissions and preparing the data for modulating into RF energy radiated by a transmitter and intercepted and processed by multiple receivers.

Arbiter

Referring to FIG. 1, each DDL network session 15 is coordinated by one of the DDL nodes 100, 200, 300, 400, or 500, operating in the role of "arbiter." This arbiter node is usually onboard an aircraft UAV1 or UAV2 to benefit from the advantaged position up in the air. In various other network environments (not shown), for example in a totally ground based network environment, the arbiter may be in a node that is advantageously positioned to, capable of, or particularly effective at communicating with the other nodes. Or, it may be in a node in secure location, if desired. In FIG. 1, DDL node 100 in UAV1 is illustrated in the role of arbiter. The primary duty of the arbiter is to schedule time slots during which each node is allowed to transmit. Sharing of a communications channel by time scheduling is known as "Time Division Multiple Access" (TDMA).

The arbiter 100 controls the bandwidth for each of the client nodes 200, 300, 400, and 500. The arbiter 100 sets the bandwidth for each node 200, 300, 400, and 500. If the bandwidth allocated by the arbiter 100 is not required by any of the nodes 200, 300, 400, and 500, the arbiter gives the bandwidth to another of the nodes 200, 300, 400, or 500. The arbiter moves the bandwidth allocation around. This allows the arbiter 100 to allocate to one node a large bandwidth, and to another node a small bandwidth, based on the needs of each of the nodes 100, 200, 300, 400, and 500. Thus, the arbiter 100 controls all communication in the network session 15.

Further, all communication is between a DDL node 200, 300, 400, or 500, and the arbiter 100. Generally the arbiter 100 is in an airplane, but anyone of the nodes 200, 300, 400, or 500 could be the arbiter. The arbiter 100 could be on the ground, but generally it is placed in an aircraft because an aircraft has the best line of sight for transmitting wireless signals. As shown in FIG. 1, a node 300 in another airplane UAV2 may relay through the arbiter 100 in airplane UAV1 to the other nodes 200, 400, or 500. In this embodiment, in addition to being the arbiter, DDL node 100 may also have its own session video, vehicle control data, or other data to communicate. Thus, the DDL node 100 also participates in the allocation of bandwidth at the arbiter 100.

In conventional TDMA applications, a predetermined cycle is used. In various embodiments of the present application, the arbiter 100 can set up a regular cycle for transmission, but it is able to vary bandwidth allocated to each node 200, 300, 400, or 500 based on the session 15 bandwidth needs. The arbiter 100 is not locked into a predetermined cycle. The bandwidth for each node 200, 300, 400, or 500 can change from burst to burst. The decision making on how to allocate bandwidth is by the arbiter 100. If there is low bandwidth data, such as only voice data, the arbiter could set up a more structured network analogous to a TDMA. If the data requirements change the arbiter 100 can change bandwidth allocation. For example, sometimes the arbiter 100 may require high bandwidth to send a whole new full frame of new video to a ground station GCU1, or and thereafter it may just need to send low bandwidth incremental video to the ground station GCU1. As the amount of data changes, the arbiter 100 can vary the allocation to each node 200, 300, 400 and 500. The arbiter 100 can be reactive to the data transmission needs within the session 15.

Node Addressing

Figure 3A:
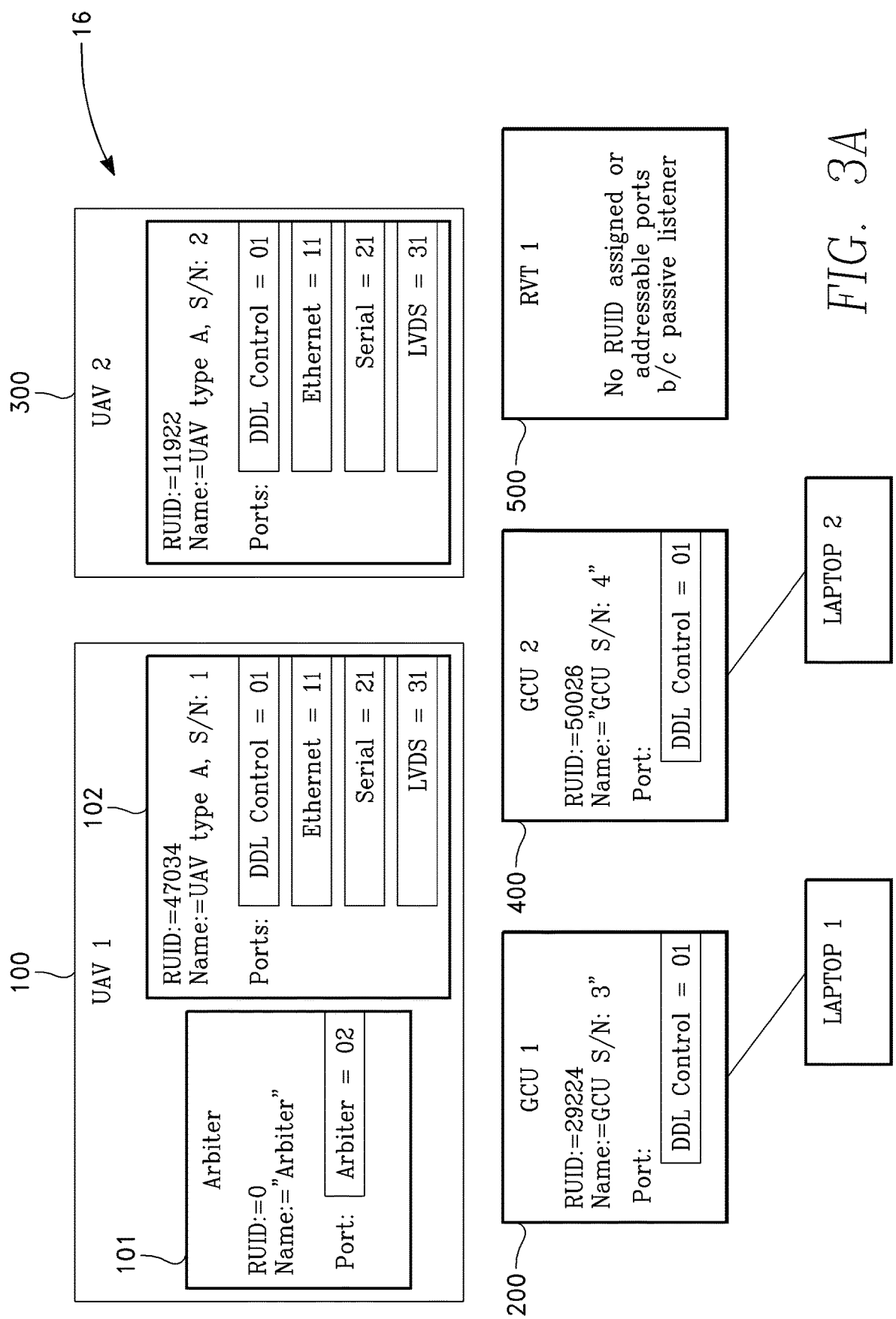
FIGS. 3A and 3B show block diagrams of node addressing for a sample DDL session, from the perspective of a laptop connected to a ground control station.
Figure 3B:
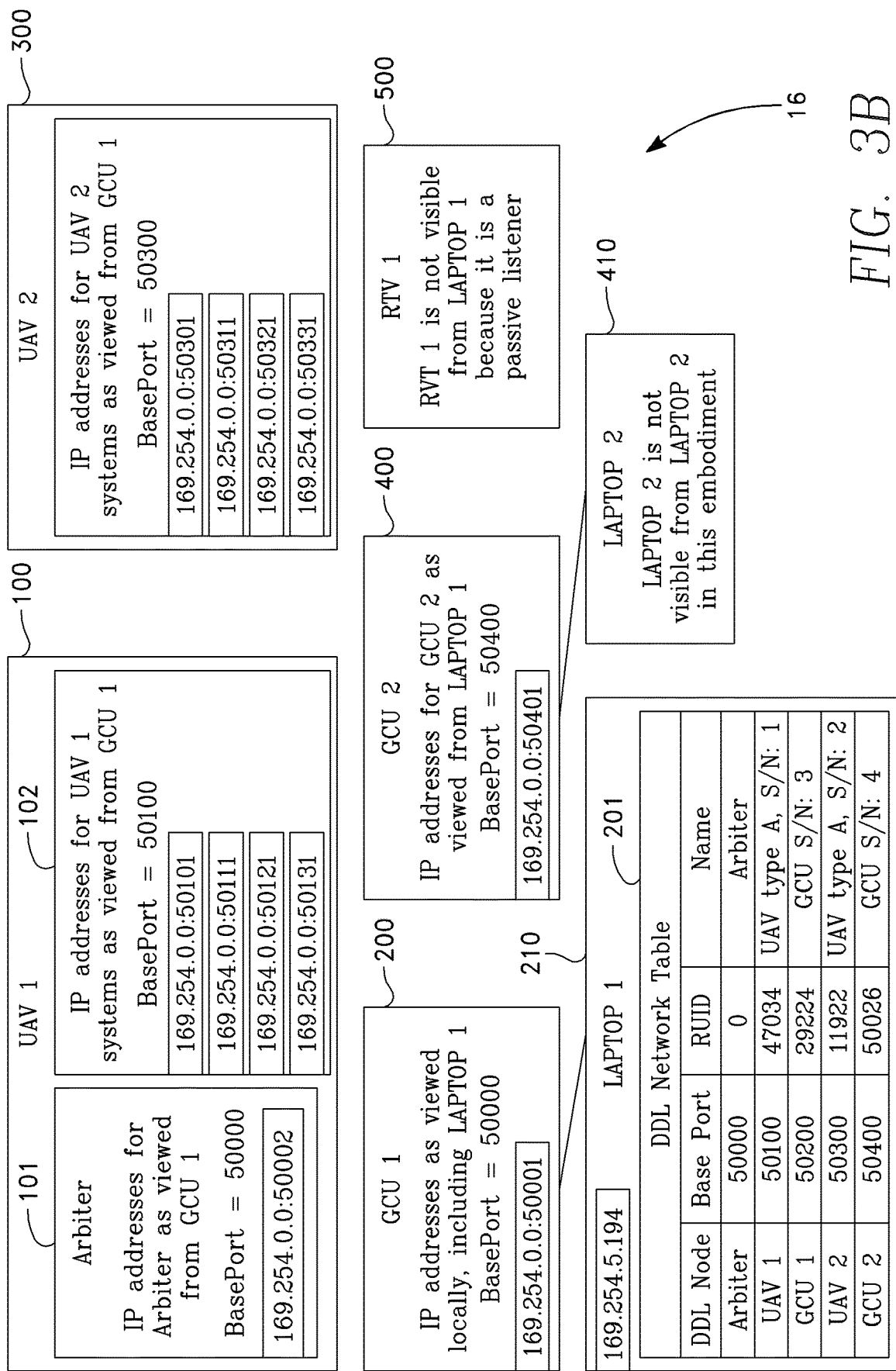

FIGS. 3A and 3B show block diagrams of node addressing for a sample DDL session 16, from the perspective of LAPTOP1 connected to ground control station GCU1. FIG. 3A shows a block diagram of illustrating the Random Unit Identifiers (RUID) and the specific input/output channels or ports of the DDL nodes 100, 200, 300, 400, and 500. For communication between the DDL nodes 100, 200, 300, 400, and 500, the Random Unit Identifiers (RUID) (sometimes alternatively referred to as Session User Identifiers (SUID)) and the specific input/output channels are designated by DDL port numbers: 01 for DDL Control, 11 for Ethernet, 21 for Serial communications, 31 for LVDS or Low Voltage Differential Signals, and 02 for the Arbiter are used.

For communication, the ground control station DDL node to which a laptop is connected maps known DDL nodes into IP port number ranges to allow software on the laptop to address the DDL nodes using conventional IP address and port number pairs. FIG. 3B shows a block diagram illustrating an example of mapping of know network nodes 100, 200, 300, 400, and 500 within a network session 16 by the ground control station DDL node 200. LAPTOP1 210 is connected, into IP port number ranges for use by LAPTOP1 210. This allows software on the LAPTOP1 210 to address the DDL nodes using conventional IP address and port number pairs. The conventional IP address (xxx.xxx.xxx.xxx) and the base port addresses are generated by the GCL1 DDL node 200 to provide to the LAPTOP1 210. The DDL Network Table 202 show and example of the conventional IP addresses (xxx.xxx.xxx.xxx) with the base port addresses, i.e. 5000, 50100, 5200, 5300, and 50400, that are assigned by the GCL1 DDL node 200 to provide to the LAPTOP1 210 for the session 16. The DDL node 200 uses the RUID addresses and port numbers shown in FIG. 3A to communicate with the other DDL nodes 100, 300, 400, and 500.

Referring to FIG. 3A, the Arbiter 101 and the UAV1 systems 102 have separate RUID addresses, 0 and 47034, respectively, in this example. Thus, the Arbiter 101 and the UAV systems 102 are assigned distinct base ports 50000 and 50100.

Note that in the example of FIG. 3B, DDL node 500 is a passive listener so is note addressable by LAPTOP1 210, so does not appear in the DDL Network Table 201. In other embodiments, RTV 500 may be addressable. Similarly, LAPTOP2 410 is not addressable in this example, but may be in other embodiments. For example, in some embodiments, RTV 500, or LAPTOP2 410 may be addressable to communicate text or other messages.

Referring to FIG. 3B, each DDL node that has a laptop attached generates its own DDL Network Table (not show) for its respective laptop. As such, a different DDL Network Table (not shown) would be generated by the GCU2 DDL node 400 for laptop 410.

Messages and Packets

DDL Messages convey commands between DDL nodes. Bandwidth allocation strategies govern how DDL nodes share the RF channel to communicate with other DDL nodes, and support connections to and between external devices. Communication between DDL nodes is conveyed in a small set of packets with specific header information and message content. DDL nodes communicate with each other via messages described in Table 2. Note that data from an external device is carried in one of these messages.

Referring to FIG. 1, in various implementations, each node 200, 300, 400, and 500 requests from the arbiter 100 the amount of bandwidth it needs. As shown below in Table 2, the nodes 200, 300, 400, and 500 request a desired amount of bandwidth that it would like or Desired BW, and also a minimum amount of bandwidth that it requires or Required BW. Further, in various embodiments, the nodes 200, 300, 400, and 500 may request a service interval, the longest time to wait before sending more data using Slot start and Slot duration, and request a preferred allocation size or Allocated BW, because some data may have an inherent size associated with it. Based on these requests, the arbiter 100 controls the bandwidth with each of the nodes 200, 300, 400, and 500.

TABLE 2

DDL Messages

| Meaning | Source | Destination | Parameters | Exported to Ethernet |
|---|---|---|---|---|
| Request BW | Client | Arbiter | RUID<br>Type (1 = GCU,<br>2 = A/C,<br>3 = External)<br>Name (32 characters)<br>Required BW (Kb/sec)<br>Desired BW (Kb/sec) | no |
| Slot Allocation | Arbiter | All | RUID<br>Allocated BW (Kb/s)<br>Slot start (usec after cycle sync)<br>Slot duration (usec) | no |
| Data | Client | All | various video, TM, or external data | yes |
| Control | Client | Client | various autopilot commands | no |
| Limit BW | Client | Client | Limit BW (Kb/sec) | no |
| | | | Above message commands that client to adjust its requested BW, to accommodate other clients. | |
| Assume Arbiter | Client | Client | | no |
| Release Arbiter | Client | Arbiter | | no |
| Publish Arbiter | Arbiter | All | | no |
| Change Channel | Client | Client or All | New channel number<br>New band number<br>Timeout (msec) | no |

The messages of Table 2 are transmitted as DDL packets, which also include the fields described in Table 3 below. DDL Messages include the fields shown in Table 3 to assist the receiver.

TABLE 3

DDL Message Control Fields

| Parameter | Explanation |
| --- | --- |
| Message Type | Selects from the set of defined messages. |
| Sequence Counter | Incremented by 1 for each message generated by a node. This reveals if messages arrive out of order, or are lost. |
| Time to Live | Number of relay hops remaining. Zero means done. |

Figure 4A:
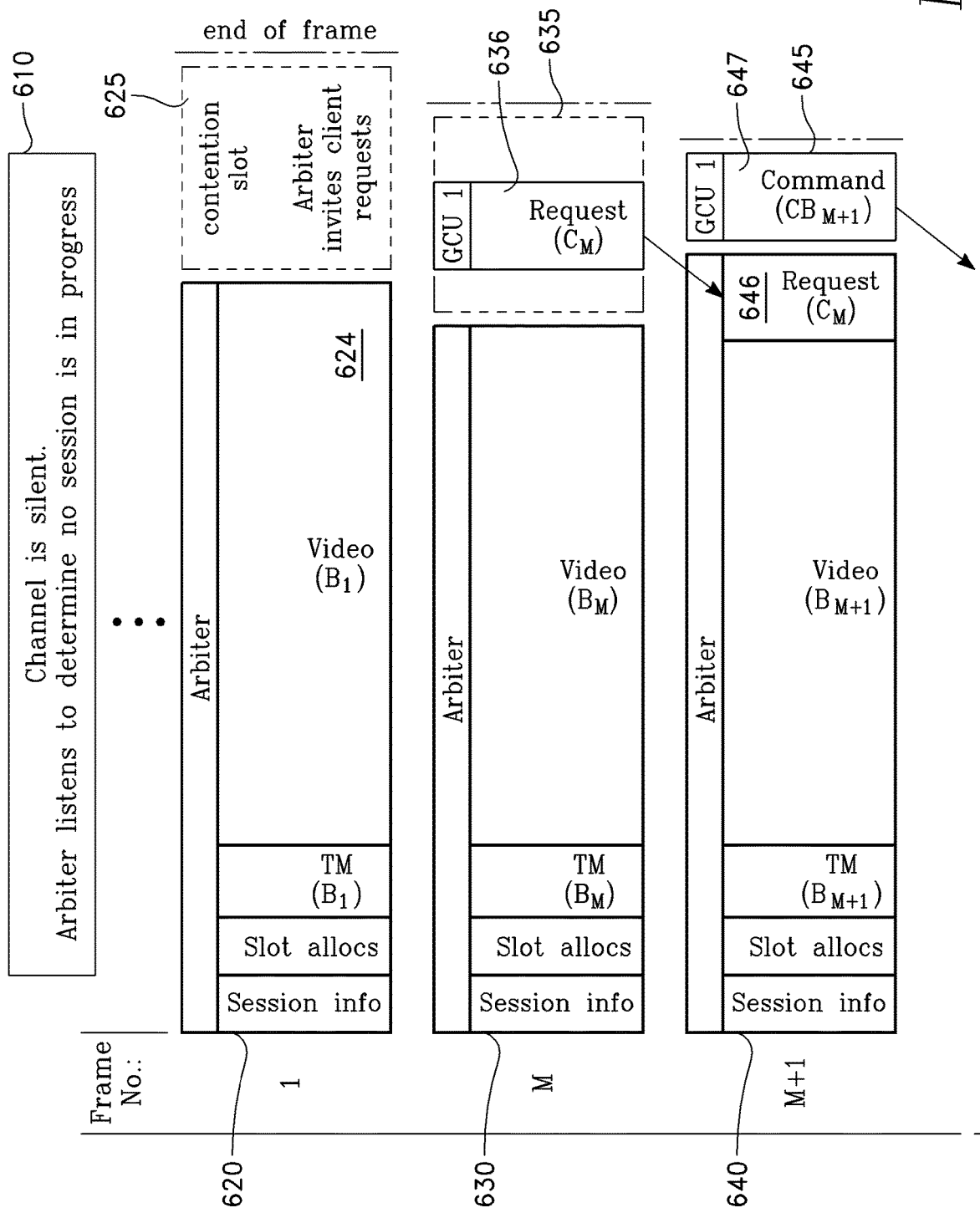
FIGS. 4A and 4B show a block diagram showing transmit slot allocations of arbiter cycles over a mission lifetime for one aircraft being controlled by one ground control station.
Figure 4B:
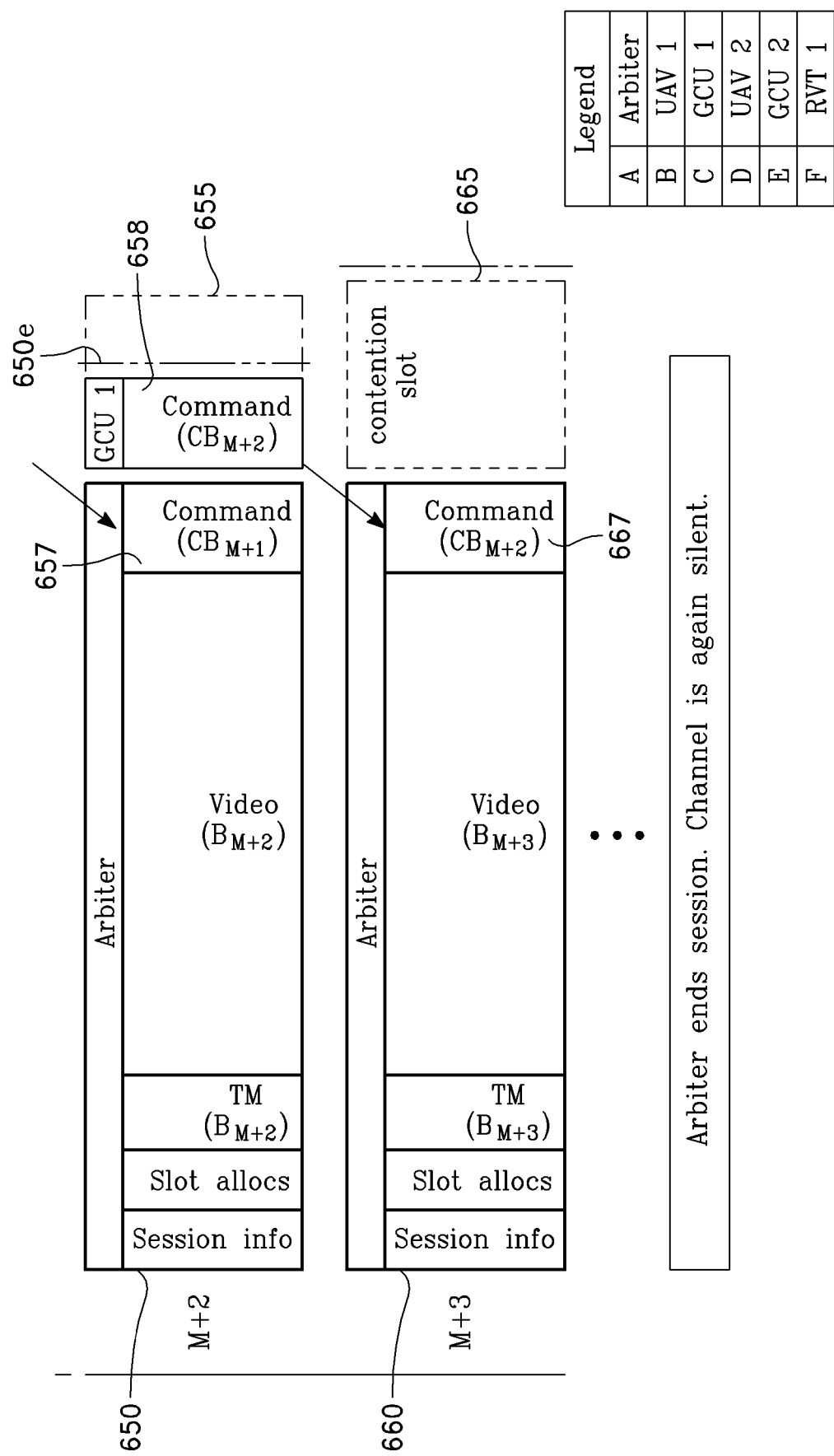

Example Scenarios and Messages
One Aircraft and One GCS
(FIGS. 4A and 4B)

FIGS. 4A and 4B show a block diagram showing transmit slot allocations of arbiter cycles over a mission lifetime for one aircraft being controlled by one GCU. In this example communications in a simple mission scenario 600 where an operator powers up one UAV and one GCU, preflights the aircraft, launches and flies it to the area of interest, observes those areas, flies back home, and lands.

In this scenario 600, the aircraft listens to determine if there is a session in progress at block 610, and upon hearing no existing session in progress, initiates its own session by taking on the role of arbiter for this channel, in this geographic area of reception. The arbiter session is ready to accept any UAVs and GCUs which might check in, at any time. The arbiter will allocate in frame 620 (Frame No. 1), the maximum bandwidth to block 624 for the UAV downlink video stream. This is because initially, the only other demands on the channel are relatively low: flight commands uplink from the GCU 1 to the aircraft, and contention slots 625 allocated by the arbiter for new nodes to check in and request bandwidth.

The GCU 1 hears the arbiter, and in frame 630 (Frame M), joins the session to obtain a bandwidth allocation. In frame 630 (Frame M), the GCU1 issues a request 636 in contention slot 635 and takes control of the UAV in frame 640 (Frame M+1), which it will retain for the duration of the mission.

The request 636 by the GCU1 is granted slot 646 in frame 640 (Frame M+1) and the GCU1 issues a command 647 in contention slot 645. The command 647 is granted slot 657 in frame 650 (Frame M+2). The GCU1 issues a command 648 in contention slot 655. The GCU1 transmits the command data 657 but does not need the entire slot 657 so the arbiter ends frame 650 at 650e and starts the next frame 660 (Frame M+3), where the command 658 is granted slot 667. The arbiter offers contention slot 665 for new requesters.

The RVTs which tune to this channel and which have the correct encryption key for this session can view the video transmitted down from the UAV 1.

Video Relay: Two Aircraft and One GCS
(FIGS. 5A and 5B)

Figure 5A:
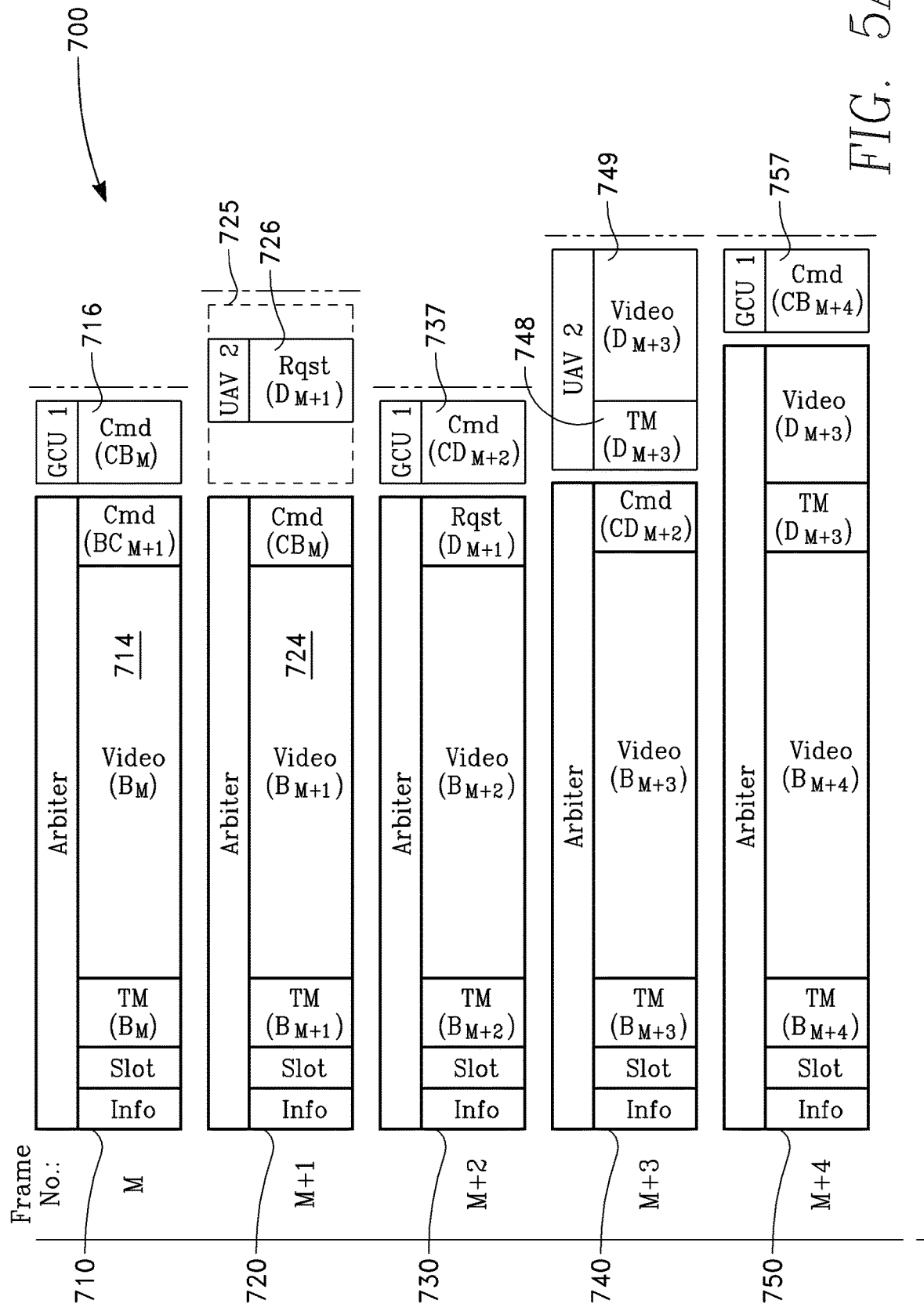
FIGS. 5A and 5B is a block diagram illustrating transmit slot allocations of arbiter cycles over a mission lifetime for an example video relay scenario.
Figure 5B:
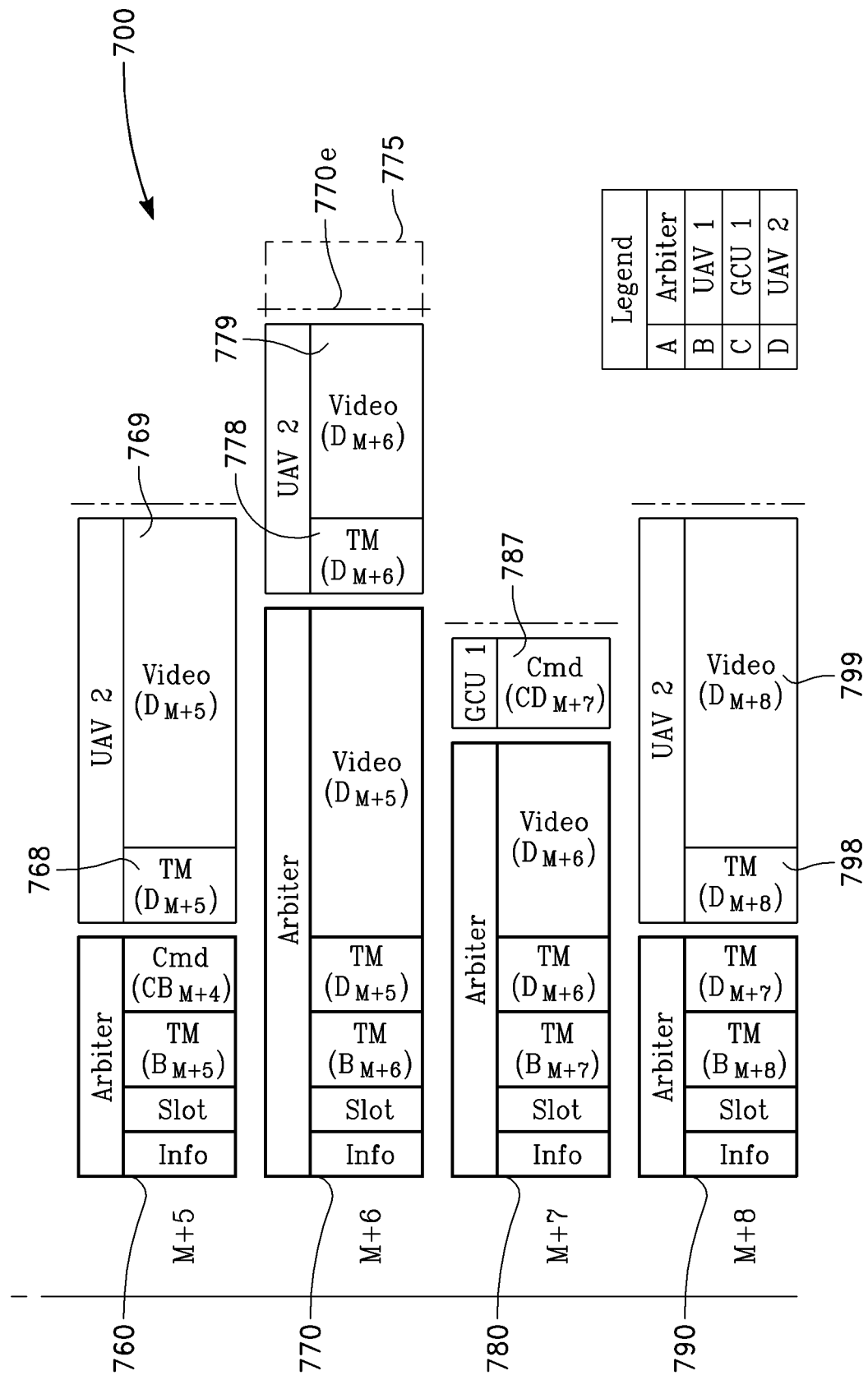

FIGS. 5A and 5B is a block diagram illustrating transmit slot allocations of arbiter cycles over a mission lifetime for an example video relay scenario 700. In this example, an operator uses one UAV1 as a "relay" to communicate with a second remote "sensor" UAV2. The sensor UAV2 cannot communicate with the GCU1 directly because it is either beyond radio range of the GCU1, or not in line-of-sight of the GCU1. The operator first powers up the GCU1 and the relay UAV1, and flies it to a relay station from which it can communicate with both the GCU1 and with the sensor UAV2 when it arrives in its planned area of operation. The operator then powers up the sensor UAV2, flies it to its area of operation, and operates it. Upon completion of the mission, the sensor UAV2 is recovered first, followed by the relay UAV1. Extended relay mission durations can be achieved by relieving the relay UAV1 when it approaches battery exhaustion: this is described below in the Relay Relief scenario FIGS. 6A and 6B.

Upon first powering up, the relay UAV2 hears no existing session in progress and initiates its own session by taking on the role of arbiter for this channel, within this geographic area of reception. The arbiter session is ready to accept additional UAVs and additional GCUs that might check in at any time. Shown in frame 710 (Frame M), GCU1 is controlling UAV1, while UAV1 is transmitting high bandwidth video in slot 714. The arbiter will initially allocate maximum bandwidth to video slot 714 to the downlink video stream from its own UAV1, since the only other demands on the channel are the flight command 716 uplink from the GCU1 to the UAV1 and contention slot 725 opportunities allocated by the arbiter for new nodes to check in and request bandwidth, shown in frame 720 (Frame M+1). This allocation continues while the relay UAV1 is flown to its relay station.

When the relay UAV1 is airborne, the operator can power up the sensor UAV2, preflight it, launch it, and fly it out to its area of operations. Upon powering up, the sensor UAV2 hears the existing session conducted by the relay UAV1, and checks in with a request 726 for high bandwidth to support its video stream. In this example, in frame 720 (Frame M+1), the arbiter invites new requests in slot 725 and UAV2 request moderate bandwidth video 726, but it exceeds capacity. Having previously granted maximum bandwidth to the relay UAV1 video at 724, the arbiter must now adjust the bandwidth allocations to satisfy the sensor UAV2 request. The arbiter adjusts the bandwidth allocations based on the bandwidth policy in effect at that time, typically reducing the allocation of current streams and granting an allocation to the sensor UAV2. The allocation for the sensor UAV2 video stream will be set cognizant of the need for the relay UAV1 to receive the sensor UAV1 stream and retransmit it.

In frame 730 (Frame M+2), GCU1 controls UAV2 and sends pilot commands in slot 737. In frame 740 (Frame M+3), UAV2 transmits telemetry and very low bandwidth video in slots 748 and 749, respectively. In frame 750 (M+4), GCU1 commands UAV1 to reduce to minimum bandwidth in slot 757. In frame 760 (Frame M+5), UAV2 transmits telemetry and moderate bandwidth video in slot 768 and 769, respectively. In frame 770 (Frame M+6), UAV2 transmits telemetry 778 and video 779 but does not need entire slot 775 so the frame 770 (Frame M+6) ends at 770e. The arbiter starts the next frame 780 (Frame M+7) early. In frame 780 (Frame M+7), GCU1 sends pilot commands in slot 787 to UAV2. In frame 790 (Frame M+8), UAV2 transmits telemetry and moderate bandwidth video in slots 798 and 799, respectively.

The arbiter controls the session, thus, the arbiter grants GCU1 bandwidth in frame 710. The arbiter invites new requests in frame 720. In frame 730, the arbiter grants GCU1 bandwidth. In frame 740, the arbiter grants UAV2 available bandwidth. At frame 750, the arbiter grants GCU1 bandwidth. The arbiter grants UAV2 moderate bandwidth in frames 760 and 770. Then, at frame 780, the arbiter grants the GCU1 bandwidth. Thereafter, the arbiter again grants UAV2 moderate bandwidth at frame 790.

RVTs which tune to this channel and have the correct encryption key for this session can view the video transmitted down from the Relay aircraft.

Figure 6A:
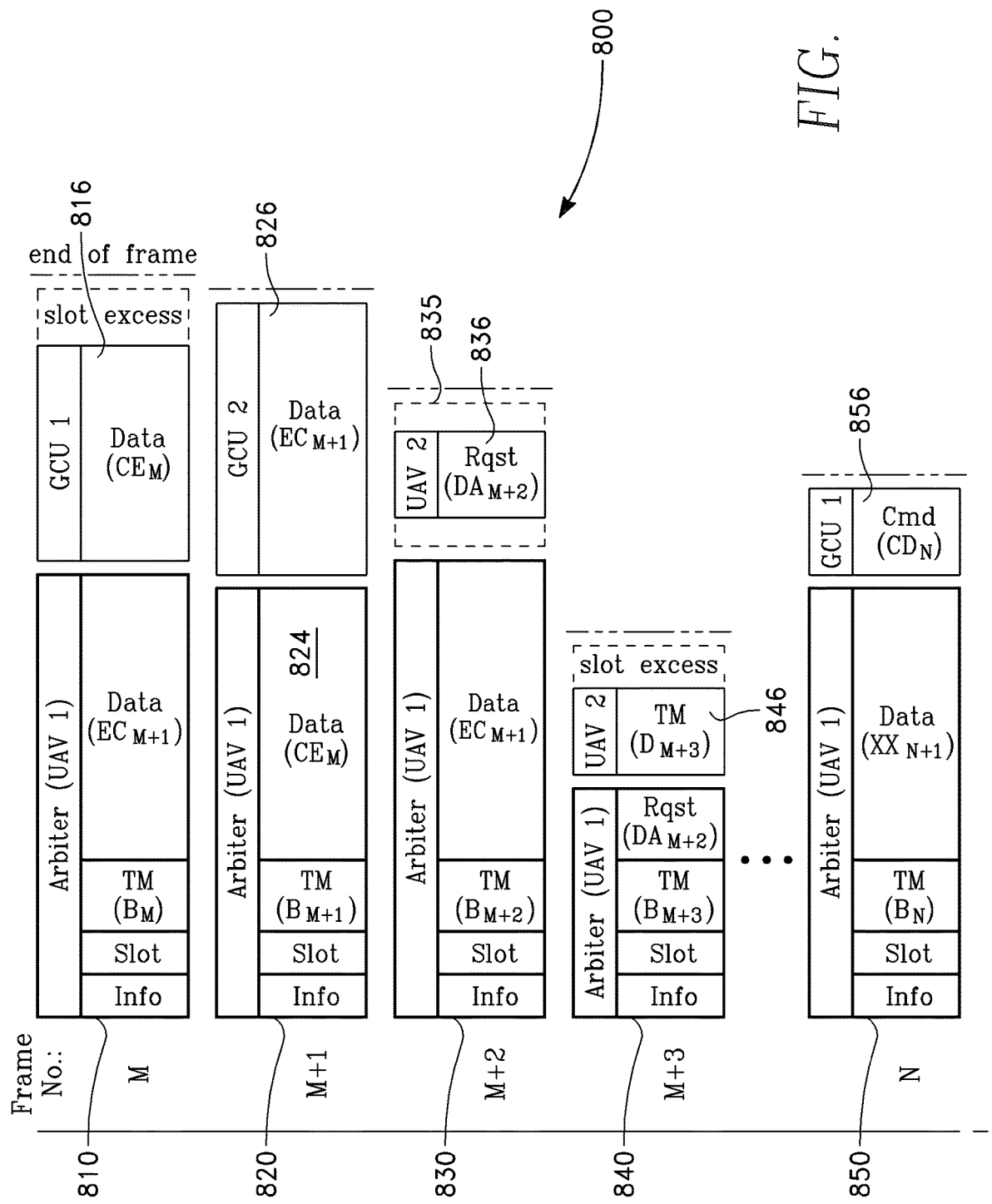
FIGS. 6A and 6B is a block diagram illustrating transmit slot allocations of arbiter cycles over a portion of a mission for an example video relay scenario.
Figure 6B:
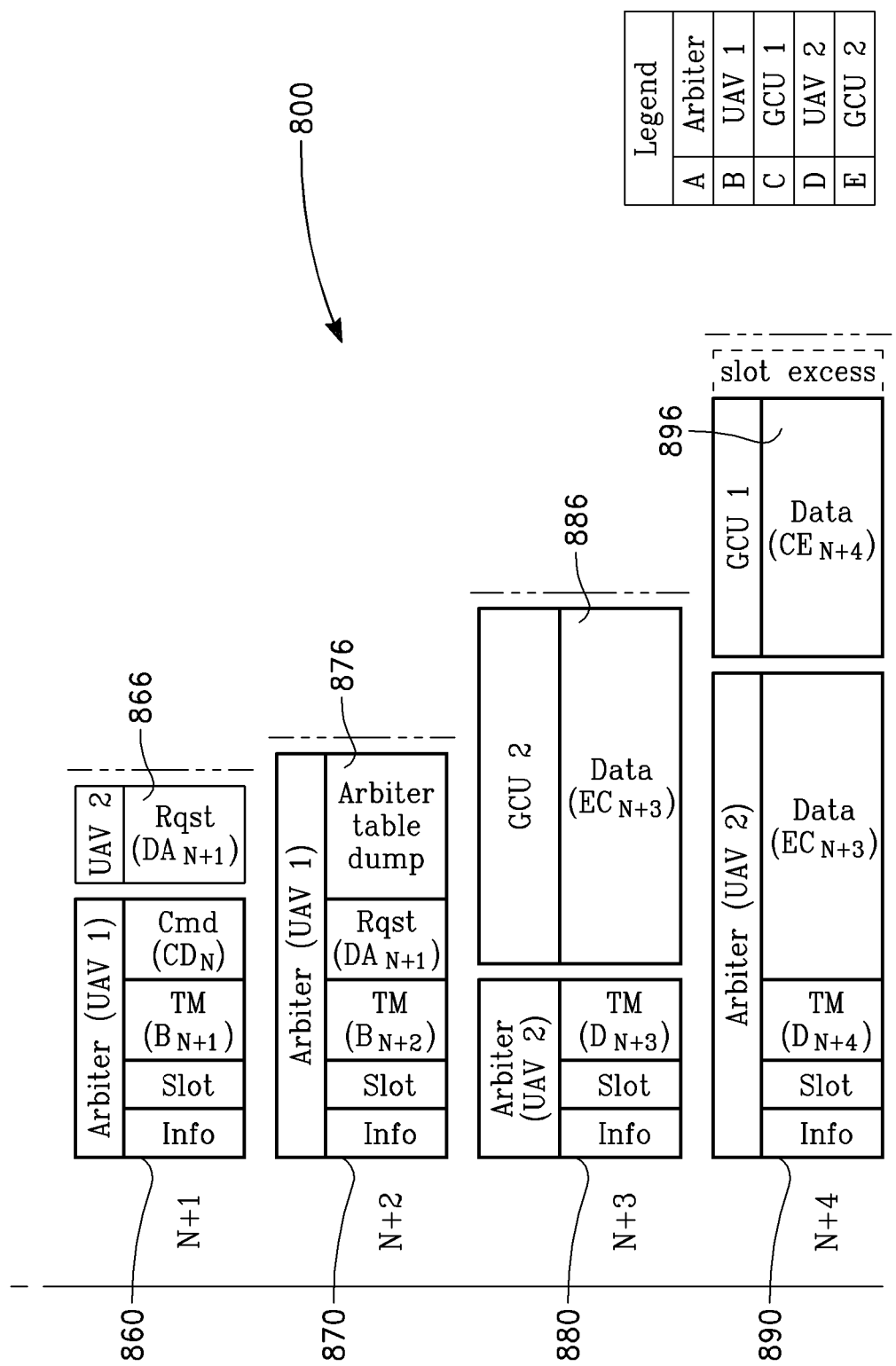

Relay Relief: 2 Aircraft/2 GCS
(FIGS. 6A and 6B)

FIGS. 6A and 6B is a block diagram illustrating transmit slot allocations of arbiter cycles over a portion of a mission for an example video relay scenario 800. In this example, transmit slot allocations of arbiter cycles over the portion of mission when a new aircraft UAV2 relieves a relay aircraft UAV1. An operator is using one aircraft as a "Relay" to communicate with other aircraft or GCUs, and that Relay aircraft reaches its limit of endurance. The operator powers up the relief UAV2 and flies it to the relay station, where it downloads the session information from the relay UAV1, and assumes the duties of arbiter.

In frame 810 (Frame M), the arbiter grants GCU1 bandwidth in slot 816 and GCU1 forwards data at 816 from its external client to GCU2 for its external client. In frame 820 (Frame M+1), the arbiter grants GCU2 bandwidth in slot 826. GCU2 is forwarding data 826 from it external client to GCU1 for its external client. In frame 830 (Frame M+2), the arbiter invites new requests, so UAV2 having turned on and detected the session in progress, UAV2 waits for a contention slot 835 and then requests in slot 836, bandwidth for transmitting its telemetry. In frame 840 (Frame M+3), the arbiter grants UAV2 bandwidth and UAV2 transmits its telemetry in slot 846.

Prior to frame 850 (Frame N), UAV2 launches and climbs to station. At frame 850 (Frame N), the arbiter grants GCU1 bandwidth and GCU1 commands UAV2 to assume arbiter at 856. In frame 860 (Frame N+1), the arbiter in UAV1 grants UAV2 bandwidth and UAV2 requests the arbiter in UAV1 to relinquish the role of session arbiter at 866. In frame 870 (Frame N+2) there is no grant of allocation slots by the arbiter in UAV1 as the arbiter in UAV1 transmits its arbiter table in slot 876 to allow UAV2 to assume the role of arbiter without forcing clients to check-in again. In frame 880 (Frame N+3), UAV2 has assumed the role of arbiter and grants GCU2 bandwidth and GCU2 forwards data at 896 from its external client to GCU1 for its external client. At frame 890 (Frame N+4), the arbiter in UAV2 grants GCU1 bandwidth and GCU1 forwards data at 896 from its external client to GCU2, for it external client.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. An unmanned aerial vehicle comprising a transmitter/receiver controlled by an operating system such that the unmanned aerial vehicle is capable of functioning as an arbiter node in a DDL session, wherein the arbiter node is configured to control an operation of a plurality of client nodes by defining communications operation cycles and allocating a bandwidth to each of the plurality of client nodes on a cycle by cycle basis in response to requests for bandwidth from the plurality of client nodes, and wherein the arbiter node is configured to prioritize the requests for bandwidth from the plurality of client nodes and to allocate bandwidth in an operation cycle based on a priority of each request.

2. The unmanned aerial vehicle of claim 1, wherein the arbiter is configured to vary the operation cycles based the requests for bandwidth.

3. The unmanned aerial vehicle of claim 1, wherein the arbiter is configured to relinquish control as session arbiter to another node upon request.

4. The unmanned aerial vehicle of claim 3, wherein the arbiter is configured to transmit an arbiter table upon request prior to relinquishing control as session arbiter.

5. The unmanned aerial vehicle of claim 1, wherein each operation cycle is divided up into a set of time segments, and wherein allocating the bandwidth comprises assigning a transmission start time and a transmission duration for each of the plurality of client nodes requesting bandwidth and changing the transmission start time and the transmission duration for each of the plurality of client nodes requesting bandwidth in response to the requests for bandwidth from the plurality of client nodes.

6. The unmanned aerial vehicle of claim 1, wherein the plurality of client nodes comprises a plurality of unmanned vehicles.

7. The unmanned aerial vehicle of claim 1, wherein the plurality of client nodes comprises a ground station.

8. The unmanned aerial vehicle of claim 7, wherein the plurality of client nodes further comprises an unmanned vehicle.

9. The unmanned aerial vehicle of claim 1, wherein the arbiter is configured such that allocating the bandwidth comprises assigning a transmission start time and a transmission duration to the plurality of client nodes and changing the transmission start time and the transmission duration for the plurality of client nodes in response to requests from the plurality of client nodes.

10. The unmanned aerial vehicle of claim 1, wherein the arbiter is configured such that assigning the bandwidth comprises controlling a video quality transmit by each of the plurality of client nodes.

11. The unmanned aerial vehicle of claim 10 wherein the arbiter is configured such that assigning the bandwidth comprises allocating bandwidth for at least one of: a) full video; b) degraded video; c) still pictures; or d) no video imagery for a client node requesting bandwidth.

12. An unmanned aerial vehicle comprising a transmitter/receiver controlled by an operating system configured to monitor for an existing DDL session and assume a role of an arbiter if no DDL session is in progress, wherein the unmanned aerial vehicle as the arbiter is configured to control an operation of a plurality of client nodes by defining communications operation cycles and allocating a bandwidth to each of the plurality of client nodes on a cycle by cycle basis in response to requests for bandwidth from the plurality of client nodes, and wherein the unmanned aerial vehicle as the arbiter is configured to prioritize the requests for bandwidth from the plurality of client nodes and to allocate bandwidth in an operation cycle based on a priority of each request.

13. The unmanned aerial vehicle of claim 12, wherein the unmanned aerial vehicle as the arbiter is configured to initiate a DDL session within the channel if no DDL session is detected within the channel.

14. The unmanned aerial vehicle of claim 12, wherein the unmanned aerial vehicle as the arbiter is configured to control the operation of a ground control unit.

15. The unmanned aerial vehicle of claim 12, wherein the unmanned aerial vehicle as the arbiter is further configured to receive vehicle control commands for the unmanned aerial vehicle from one of the plurality of client nodes and maneuver according to the vehicle control commands from the at least one of the plurality of client nodes.

16. The unmanned aerial vehicle of claim 12, wherein the unmanned aerial vehicle as the arbiter is further configured to relay data between at least two of the plurality of client nodes.

17. The unmanned aerial vehicle of claim 12, wherein the unmanned aerial vehicle as the arbiter is configured to allocate bandwidth in an operation cycle based on a priority of the data.

18. The unmanned aerial vehicle of claim 12, wherein the unmanned aerial vehicle as the arbiter is further configured to relinquish the role of arbiter to another node upon request.

19. An unmanned aerial vehicle comprising a transmitter/receiver controlled by an operating system configured to assume a role of an arbiter of a DDL session and control an operation of a plurality of client nodes by defining communications operation cycles and allocating a bandwidth to each of the plurality of client nodes on a cycle by cycle basis in response to requests for bandwidth from the plurality of client nodes, and wherein the unmanned aerial vehicle as the arbiter is configured to prioritize the requests for bandwidth from the plurality of client nodes and to allocate bandwidth in an operation cycle based on a priority of each request, and wherein the unmanned aerial vehicle as the arbiter is further configured to relinquish the role of arbiter to another node upon request.

20. The unmanned aerial vehicle of claim 19, wherein the unmanned aerial vehicle as the arbiter is configured to receive an initial request for the desired bandwidth allocation from a non-arbiter node and to grant bandwidth allocation in response to the initial request from the non-arbiter node and allow the requesting non-arbiter node to join the DDL session.

* * * * *